(12) United States Patent
Wada

(10) Patent No.: US 8,099,743 B2
(45) Date of Patent: Jan. 17, 2012

(54) SLOT-IN TYPE DISK APPARATUS

(75) Inventor: Shinichi Wada, Ehime (JP)

(73) Assignee: Panasonic Corporation, Osaka (JP)

( * ) Notice: Subject to any disclaimer, the term of this patent is extended or adjusted under 35 U.S.C. 154(b) by 891 days.

(21) Appl. No.: 11/917,141

(22) PCT Filed: Jun. 7, 2006

(86) PCT No.: PCT/JP2006/311402
§ 371 (c)(1),
(2), (4) Date: May 7, 2008

(87) PCT Pub. No.: WO2006/132264
PCT Pub. Date: Dec. 14, 2006

(65) Prior Publication Data
US 2010/0095312 A1    Apr. 15, 2010

(30) Foreign Application Priority Data
Jun. 10, 2005    (JP) ................................. 2005-171704

(51) Int. Cl.
*G11B 17/03* (2006.01)
*G11B 17/028* (2006.01)
*G11B 19/20* (2006.01)

(52) U.S. Cl. ........................................ 720/691; 720/697
(58) Field of Classification Search .................. 720/696, 720/697, 698, 700, 691
See application file for complete search history.

(56) References Cited

U.S. PATENT DOCUMENTS

| 6,016,299 A * | 1/2000 | Ishige ........................... 720/621 |
| 6,697,321 B2 | 2/2004 | Inata |
| 7,065,772 B2 * | 6/2006 | Kagawa ........................ 720/608 |
| 2002/0044522 A1 * | 4/2002 | Inata et al. ..................... 369/271 |
| 2002/0150020 A1 * | 10/2002 | Mizoguchi et al. .......... 369/77.1 |
| 2005/0286359 A1 * | 12/2005 | Ezawa et al. ................ 369/44.37 |

FOREIGN PATENT DOCUMENTS

| JP | 2002-352497 | 12/2002 |
| JP | 2002-352498 | 12/2002 |
| JP | 2004-039200 | 2/2004 |

OTHER PUBLICATIONS

International Search Report dated Aug. 8, 2006.

* cited by examiner

*Primary Examiner* — Mohammad Ghayour
*Assistant Examiner* — Adam B Dravininkas
(74) *Attorney, Agent, or Firm* — Dickinson Wright PLLC

(57) ABSTRACT

A slot-in type thin disk apparatus having a base body and a lid, which constitute a chassis outer sheath. A front surface of the chassis outer sheath is formed with a disk inserting opening into which a disk is directly inserted. The slot-in type disk apparatus is provided with a traverse moving unit which displaces a traverse base between the base body and the lid. The traverse base moving unit includes a loading motor provided on the chassis outer sheath, a slider which slides by driving of the loading motor, and a traverse cam member which is operated by movement of the slider.

5 Claims, 9 Drawing Sheets

[Fig. 1]
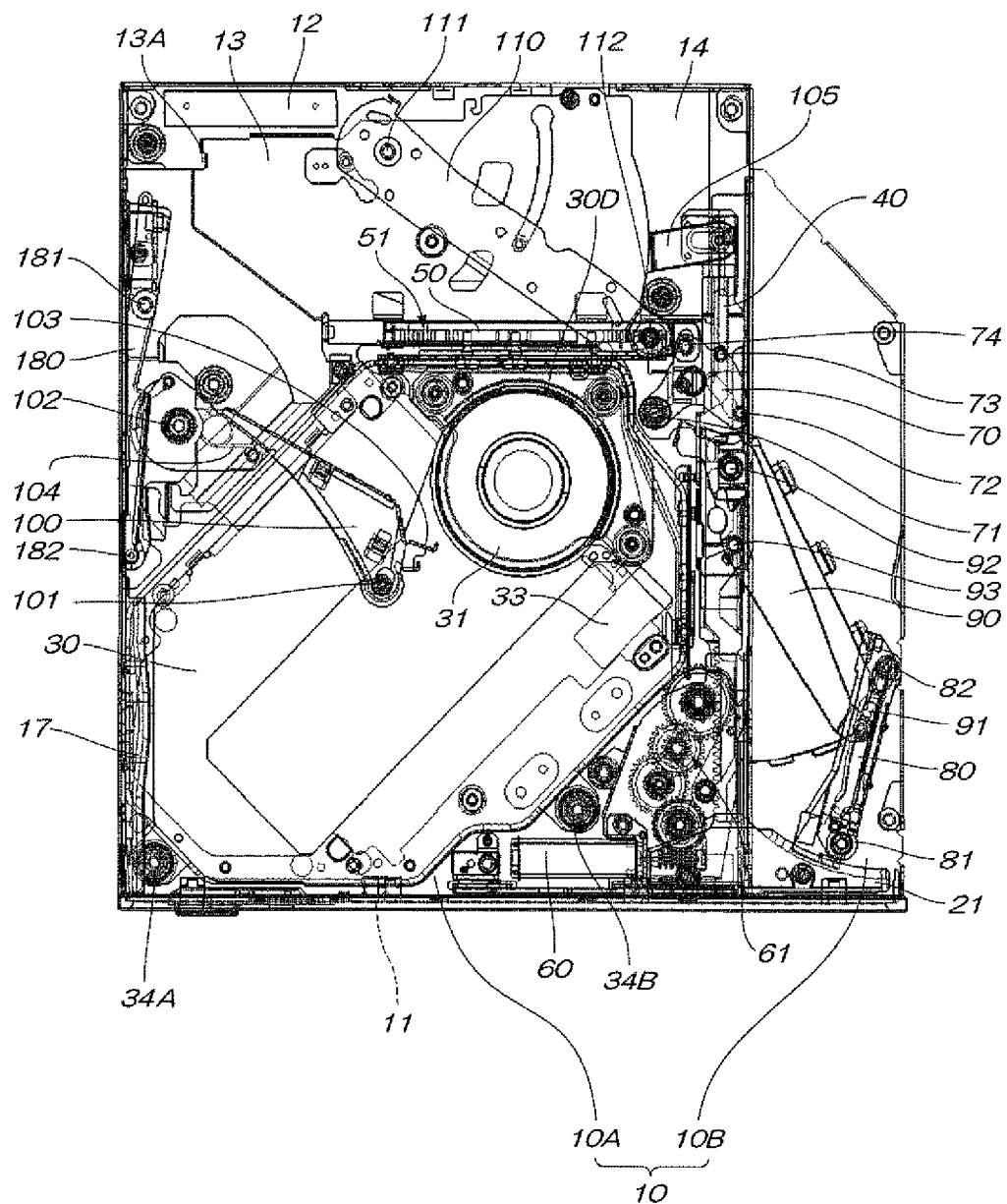

[Fig. 2]
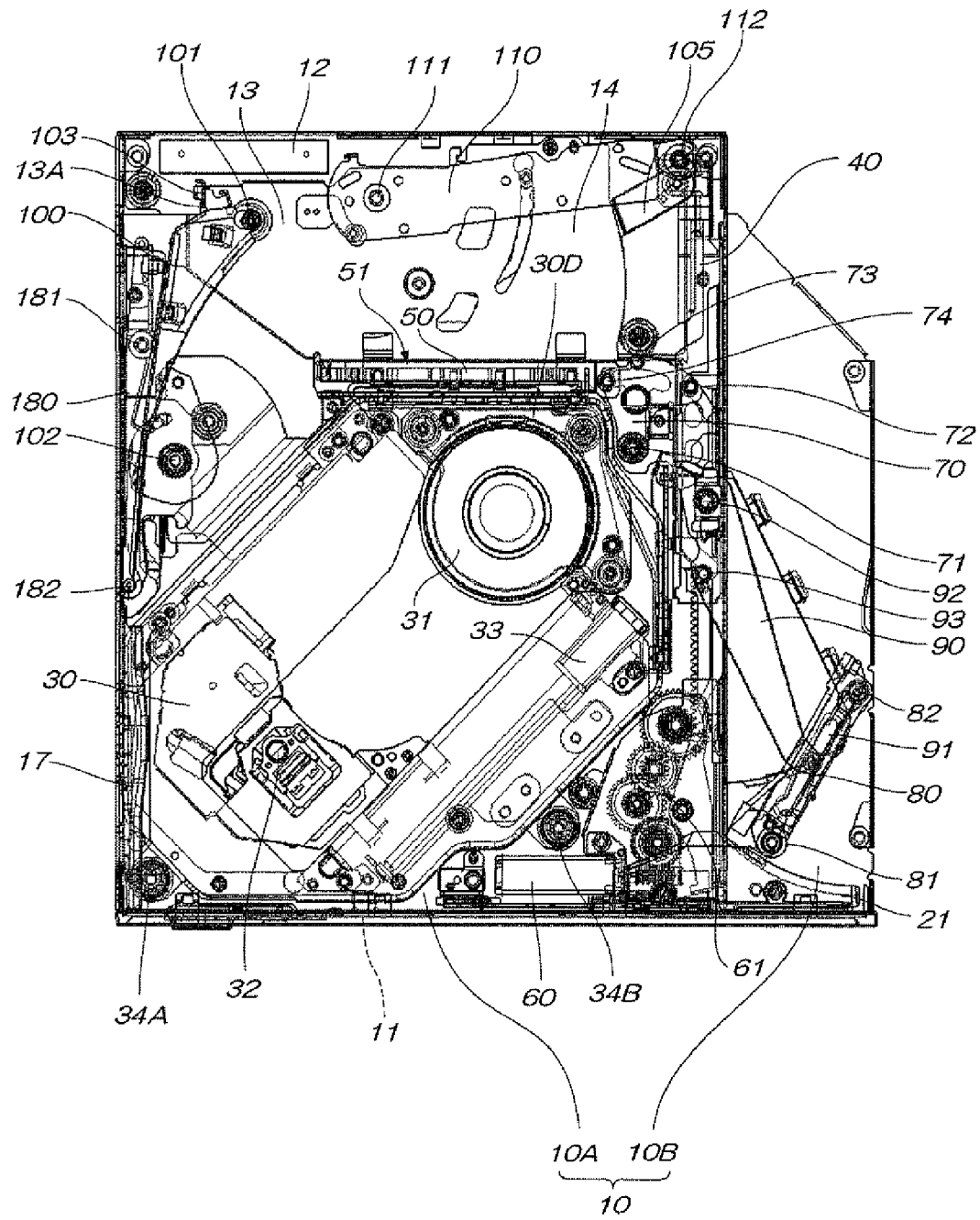

[Fig. 3]
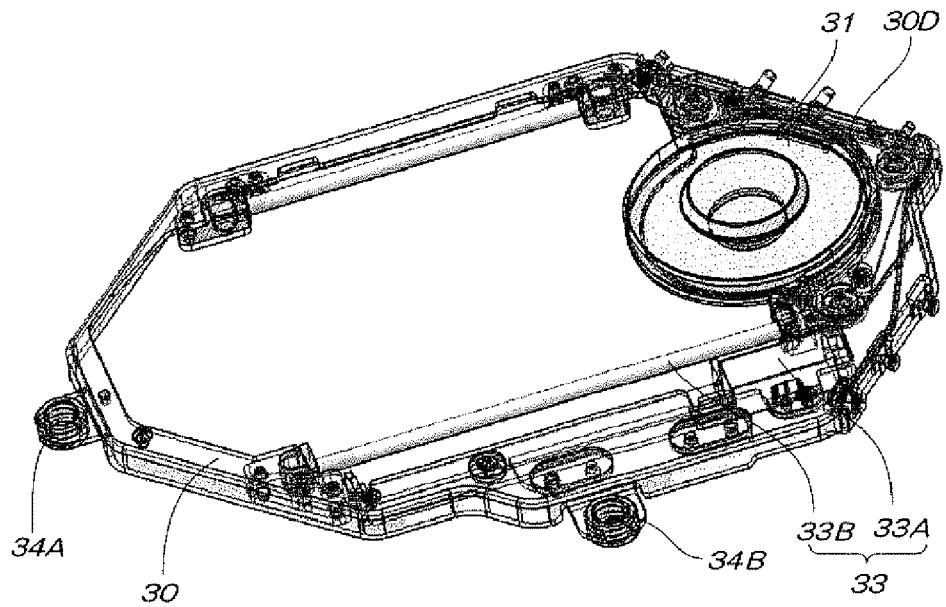
[Fig. 4]
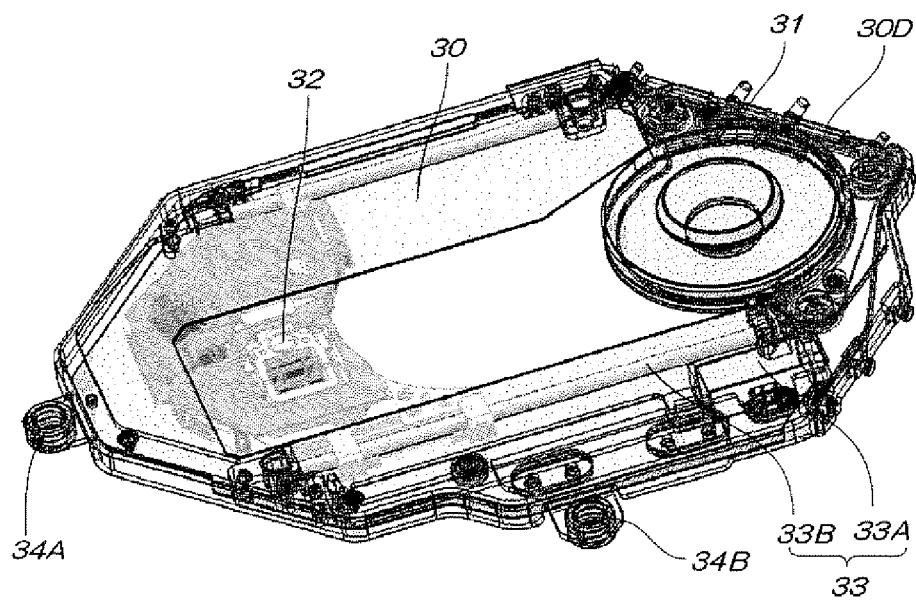

[Fig. 5]
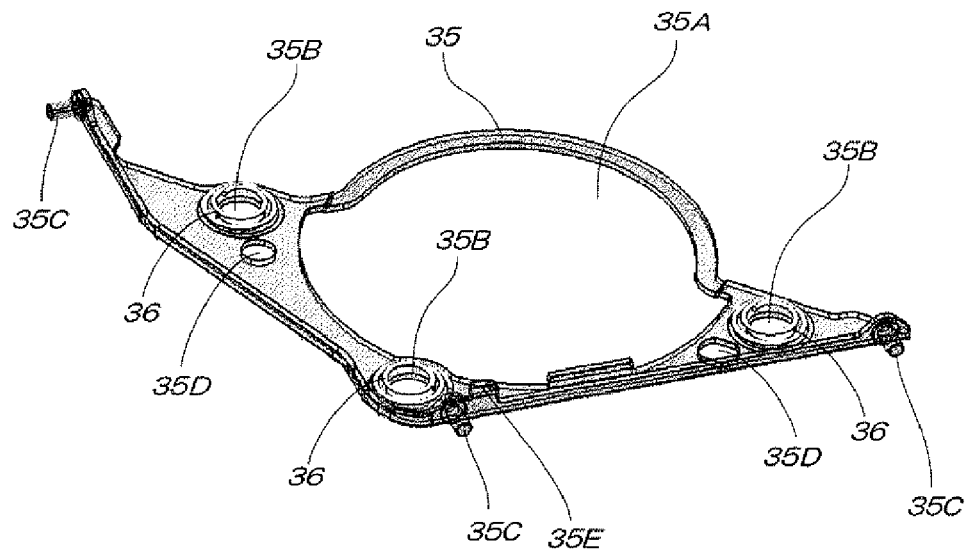
[Fig. 6]
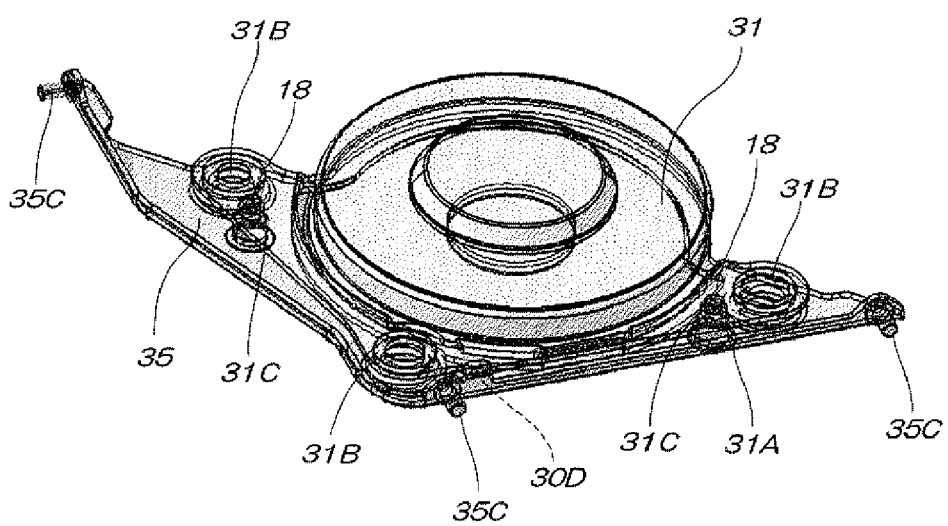

[Fig. 7]
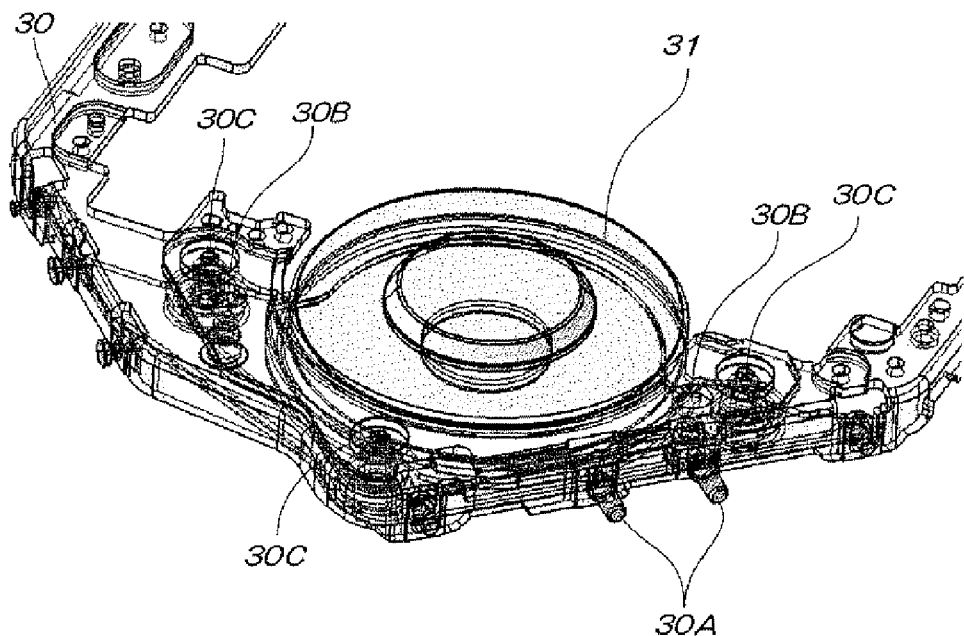
[Fig. 8]
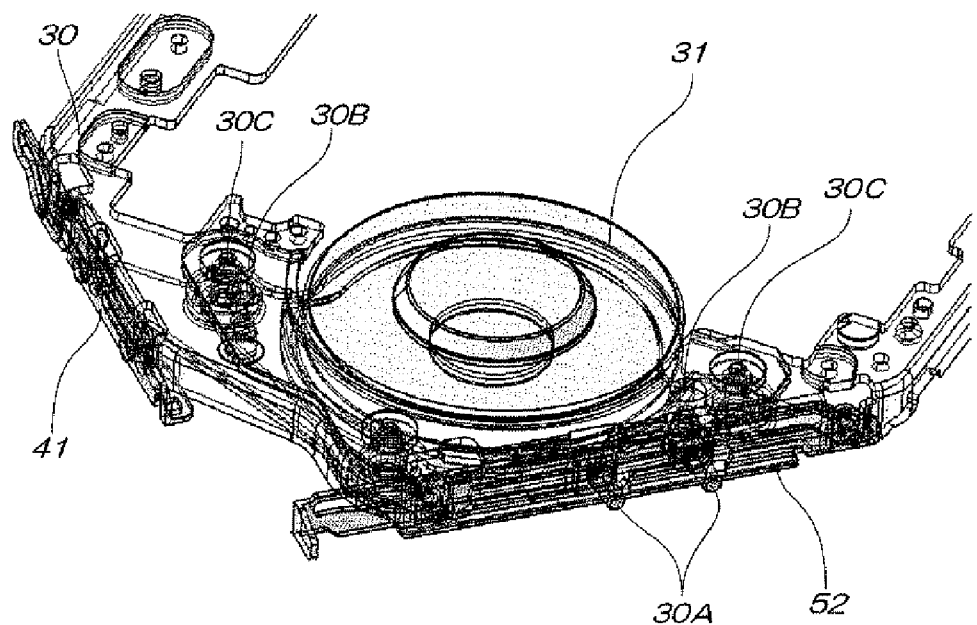

[Fig. 9]
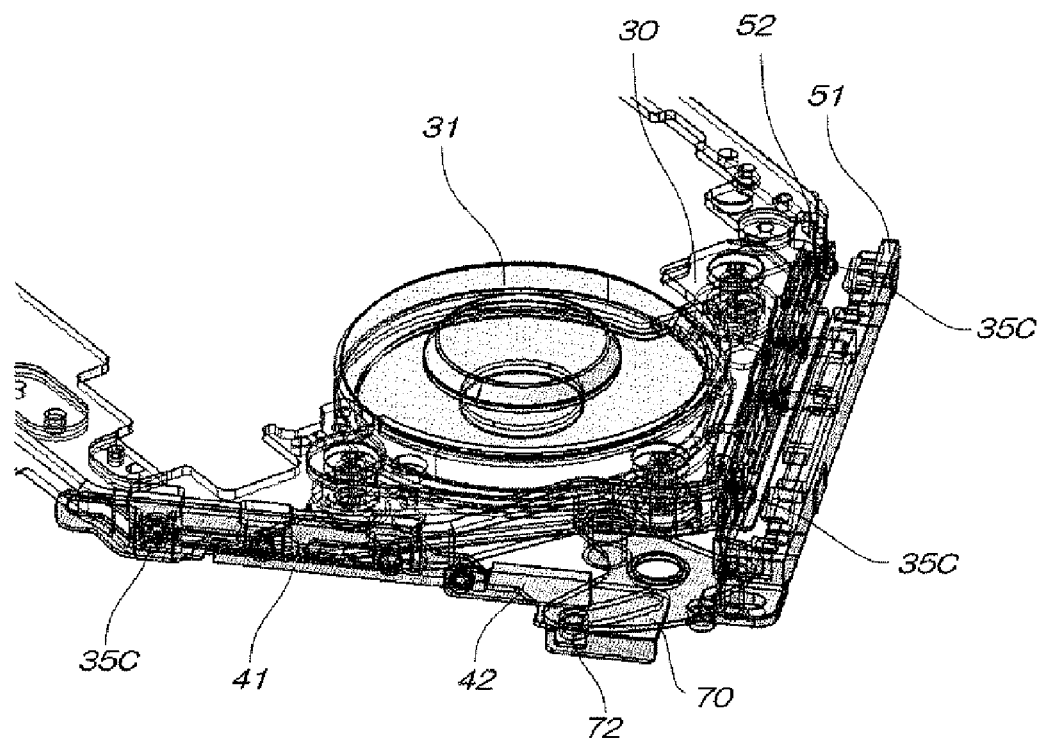

[Fig. 10]
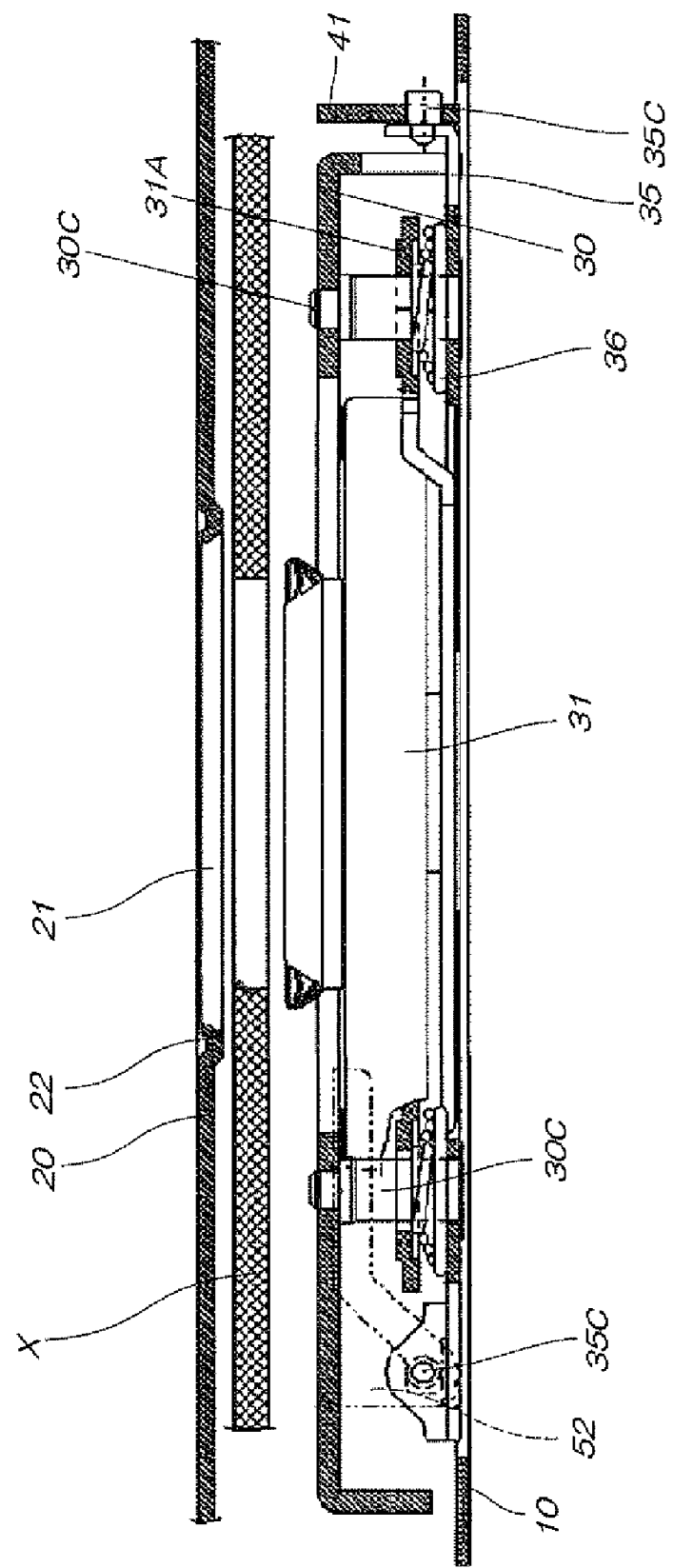

[Fig. 11]
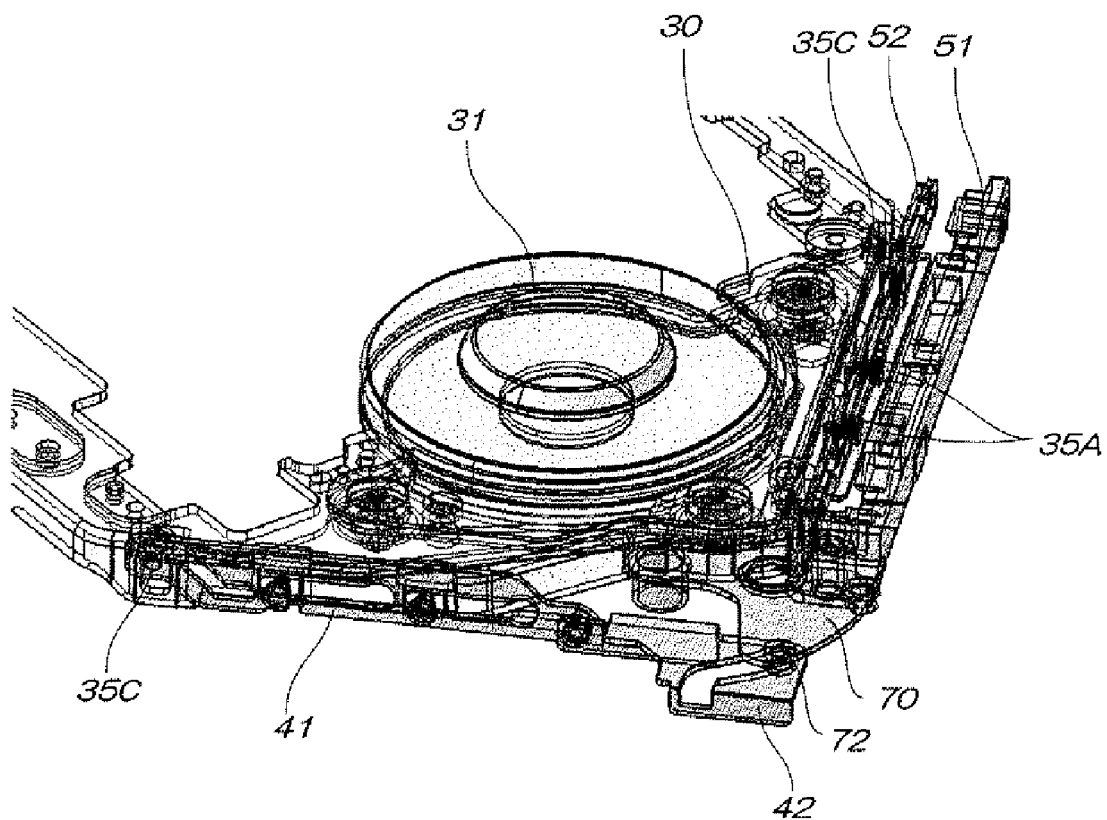

[Fig. 12]
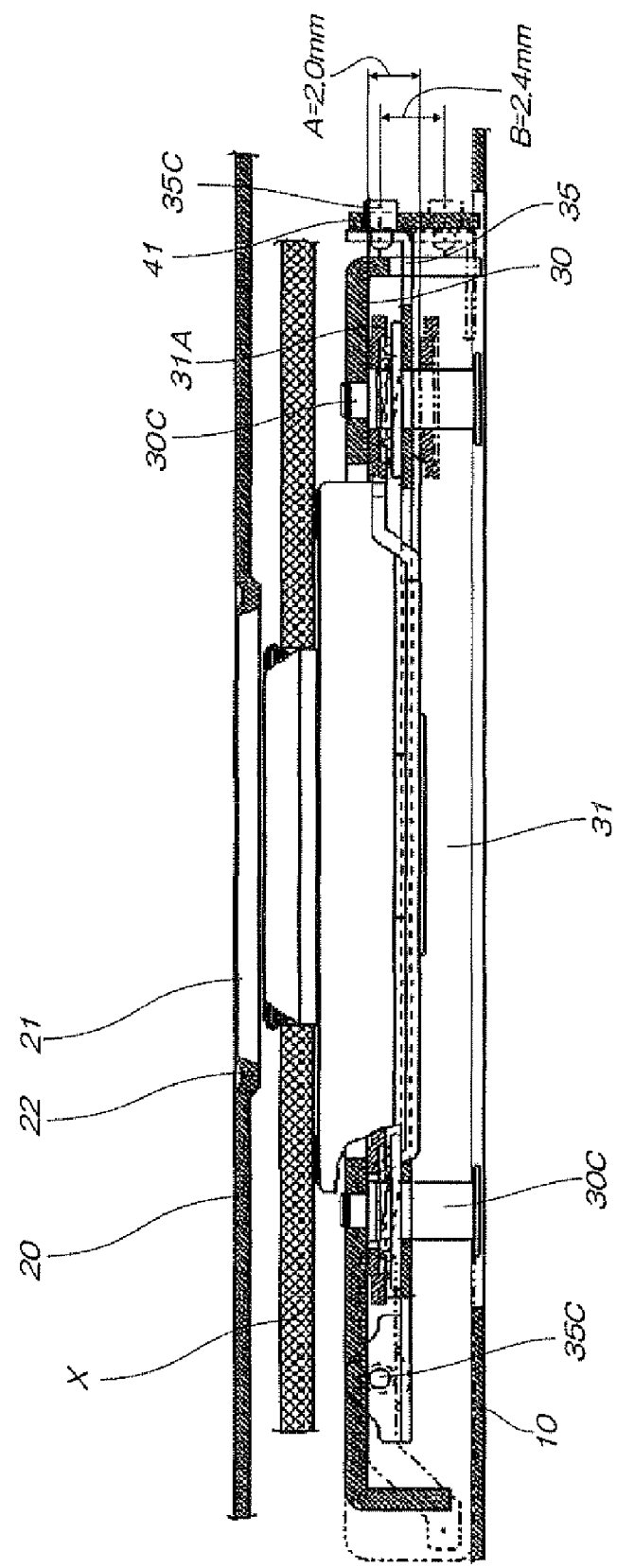

SLOT-IN TYPE DISK APPARATUS

TECHNICAL FIELD

The present invention relates to a disk apparatus for recording or replaying into or from a disk-like recording medium such as a CD and a DVD, and more particularly, to a so-called slot-in type disk apparatus capable of directly inserting or discharging a disk from or to outside.

BACKGROUND TECHNIQUE

A loading method is widely employed in conventional disk apparatuses. In this method, a disk is placed on a tray or a turntable, and the tray or the turntable is loaded into an apparatus body. According to such a loading method, however, since the tray or the turntable is required, there is a limit for thinning the disk apparatus body. Hence, recently, there exists a slot-in type disk apparatus in which a disk is directly operated using a lever or the like by a loading motor (e.g., patent document 1).

According to such a slot-in type disk apparatus, however, when a disk is inserted into and ejected from the disk apparatus, it is necessary to provide a given clearance for moving downward a spindle motor supported by a traverse base and inserting the disk. Therefore, a distance for vertically moving the traverse base is required in the thickness direction of the disk apparatus. In recent years with the reduction of personal computer in size, it is also required to reduce the disk apparatus in size and thickness. When the slot-in type disk apparatus is to be reduced in thickness, it is necessary to minimize a distance required for vertically moving the traverse base.

To solve this kind of technical problem, the present inventors have already proposed a structure capable of further downwardly moving the spindle motor with respect to the traverse base (patent document 2).

[Patent document 1] Japanese Patent Application Laid-open No.2002-352498

[Patent document 2] Japanese Patent Application Laid-open No.2004-257560

DISCLOSURE OF THE INVENTION

Problem to be Solved by the Invention

In the case of the structure proposed in the patent document 2, however, since a biasing force of the spring is strong when the spindle motor moves downward is strong and is weak when the spindle motor moves upward. Therefore, there is a problem that disturbance vibration and repeat accuracy are not stabilized at the time of playback of a disk.

Hence, it is an object of the present invention to provide a slot-in type thin disk apparatus having a sufficient clearance when a disk is inserted into and taken out from the disk apparatus, and capable of reliably attaching a disk to a spindle motor.

It is another object of the invention to apply a biasing force of a spring when a spindle motor is in a lifted position to stabilize disturbance vibration and repeat accuracy at the time of playback of a disk.

Means for Solving Problem

According to a first aspect of the present invention, there is provided a slot-in type disk apparatus in which a base body and a lid constitute a chassis outer sheath, a front surface of the chassis outer sheath is fouled with a disk inserting opening from which a disk is directly inserted, the base body is provided with a traverse base, the traverse base is provided with a spindle motor, a pickup and driving means for moving the pickup, the slot-in type disk apparatus is provided with a traverse moving means which displaces the traverse base between the base body and the lid, and the traverse base moving means comprises a loading motor provided on the chassis outer sheath, a slider which slides by driving of the loading motor, and a traverse cam member which is operated by movement of the slider, wherein the disk apparatus comprises a spindle motor support portion which holds the spindle motor, a spindle cam member which is operated by movement of the slider, a clutch plate which moves toward and away from the traverse base by the spindle cam member, and a motor spring disposed between the spindle motor support portion and the clutch plate, and the clutch plate moves toward the traverse base, and if the spindle motor moves toward the disk, thereby compressing the motor spring.

According to a second aspect of the invention, in the slot-in type disk apparatus of the first aspect, the motor spring is disposed on the side of an outer periphery of the spindle motor.

According to a third aspect of the invention, in the slot-in type disk apparatus of the first aspect, a stroke of the clutch plate is greater than a stroke of the spindle motor.

According to a fourth aspect of the invention, in the slot-in type disk apparatus of the first aspect, the spindle motor support portion and the clutch plate respectively have through holes, motor pins are respectively inserted into the through holes, and the motor spring is disposed around the motor pin as a center shaft.

According to a fifth aspect of the invention, in the slot-in type disk apparatus of the first aspect, the spindle cam member comprise two members disposed in mutually intersecting directions, the traverse cam member and the slider are disposed in mutually intersecting directions, one of two members of said the spindle cam member is disposed in parallel to the traverse cam member, and the other of two members of said spindle cam member is disposed in parallel to the slider.

According to a sixth aspect of the invention, in the slot-in type disk apparatus of the first aspect, the clutch plate is disposed on the side of an outer periphery of the spindle motor.

According to a seventh aspect of the invention, in the slot-in type disk apparatus of the first aspect, the traverse base has a projection for releasing an attached disk, and the projection is disposed on an outer periphery of the spindle motor.

Effect of the Invention

According to the present invention, the disk apparatus can be reduced in both thickness and size, and the spindle motor can be moved downward with respect to the traverse base. Therefore, a clearance required for inserting a disk can be secured even if the vertically moving distance of the traverse base is minimized, and the thickness of the disk apparatus can further be reduced.

According to the invention, the biasing force of the spring is applied when the spindle motor is in its lifted position. With this, disturbance vibration and repeat accuracy can be stabilized at the time of playback of a disk.

BRIEF DESCRIPTION OF THE DRAWINGS

FIG. 1 is a schematic plan view of a base body of a disk apparatus according to an embodiment of the present invention;

FIG. 2 is a plan view showing a state where the disk apparatus holds a disk;

FIG. 3 is a perspective view of an essential portion showing a traverse base of the disk apparatus;

FIG. 4 is a perspective view of an essential portion showing the traverse base of the disk apparatus;

FIG. 5 is a perspective view of an essential portion showing a constituting parts of the traverse base of the disk apparatus;

FIG. 6 is a perspective view of the essential portion showing the constituting parts of the traverse base of the disk apparatus;

FIG. 7 is a perspective view of the essential portion showing the constituting parts of the traverse base of the disk apparatus;

FIG. 8 is a perspective view of the essential portion showing the constituting parts of the traverse base of the disk apparatus;

FIG. 9 is a perspective view of an essential portion showing a state where the spindle motor of the disk apparatus is moved downward;

FIG. 10 is a side sectional view of the state;

FIG. 11 is a perspective view of an essential portion showing a state where the spindle motor of the disk apparatus is moved upward; and FIG. 12 is a side sectional view of the state.

EXPLANATION OF SYMBOLS

10 base body
11 disk inserting opening
12 connector
20 lid
30 traverse base
31 spindle motor
40 main slider
41 second spindle cam member
50 sub-slider
51 traverse cam member
52 first spindle cam member
70 cam lever
80 pull-in lever

BEST MODE FOR CARRYING OUT THE INVENTION

According to the first aspect of the invention, the slot-in type disk apparatus comprises a spindle motor support portion which holds the spindle motor, a spindle cam member which is operated by movement of the slider, a clutch plate which moves toward and away from the traverse base by the spindle cam member, and a motor spring disposed between the spindle motor support portion and the clutch plate, and the clutch plate moves toward the traverse base, and if the spindle motor moves toward the disk, thereby compressing the motor spring. With this aspect, the biasing force of the spring is applied when the spindle motor is in its lifted position. Therefore, it is possible to stabilize the disturbance vibration and repeat accuracy at the time of playback of a disk.

According to the second aspect of the invention, in the slot-in type disk apparatus of the first aspect, the motor spring is disposed on the side of an outer periphery of the spindle motor. With this aspect, since the spindle motor can be disposed adjacent to the base body, it is possible to reduce the thickness of the apparatus while securing a sufficient clearance when a disk is inserted into and taken out from the disk apparatus.

According to the third aspect of the invention, in the slot-in type disk apparatus of the first aspect, a stroke of the clutch plate is greater than a stroke of the spindle motor. With this aspect, when the spindle motor is moved downward, a force of the motor spring is not applied, and the force of the motor spring is applied only to an over stroke portion after the spindle motor moves upward by the stroke. Further, since a load of the motor spring can be set to a high value, the biasing force of the spindle motor acting on the traverse base can be made strong, and it is possible to enhance the stability against the self vibration and disturbance vibration. Further, since it is possible to bias the spindle motor against the traverse base with a high load, it is possible to enhance the stability of the repeat accuracy.

According to the fourth aspect of the invention, in the slot-in type disk apparatus of the first aspect, the spindle motor support portion and the clutch plate respectively have through holes, motor pins are respectively inserted into the through holes, and the motor spring is disposed around the motor pin as a center shaft. With this aspect, stable vertical movement of the spindle motor can be secured.

According to the fifth aspect of the invention, in the slot-in type disk apparatus of the first aspect, the spindle cam member comprise two members disposed in mutually intersecting directions, the traverse cam member and the slider are disposed in mutually intersecting directions, one of the two members of the spindle cam members is disposed in parallel to the traverse cam member, and the other of the two members of the spindle cam member is disposed in parallel to the slider. With this aspect, stable vertical movements of the traverse base and the spindle motor can be secured.

According to the sixth aspect of the invention, in the slot-in type disk apparatus of the first aspect, the clutch plate is disposed on the side of an outer periphery of the spindle motor. With this aspect, since the spindle motor can be disposed adjacent to the base body, it is possible to reduce the thickness of the apparatus while securing a sufficient clearance when a disk is inserted into and taken out from the disk apparatus.

According to the seventh aspect of the invention, in the slot-in type disk apparatus of the first aspect, the traverse base has a projection for releasing an attached disk, and the projection is disposed on an outer periphery of the spindle motor. With this aspect, since the projection is disposed on the outer periphery of the spindle motor, it is possible to reliably release a disk.

Preferred Embodiment

A disk apparatus according to an embodiment of the present invention will be explained below.

FIG. 1 is a plan view of a base body of the disk apparatus of the embodiment.

The disk apparatus of the embodiment includes a chassis outer sheath comprising a base body and a lid. A bezel is mounted on a front surface of the chassis outer sheath. The disk apparatus of the embodiment is a slot-in type disk apparatus in which a disk is directly inserted from a disk inserting opening formed in the bezel.

As shown in FIG. 1, parts which perform a recording function into the disk, a replaying function from the disk and a loading function of the disk are mounted on the base body 10.

The base body 10 is formed with a deep bottom 10A and a shallow bottom 10B, and the shallow bottom 10B forms a wind portion extending from a front surface to a rear surface.

The base body 10 is formed at its front side with a disk inserting opening 11 from which a disk is directly inserted, and a connector 12 is disposed on an end of a rear surface of the base body 10. A traverse base 30 is disposed on the side of the disk inserting opening 11 of the base body 10, and a rear base 13 is disposed on the side of a connector 12 of the base body 10. The traverse base 30 and the rear base 13 are disposed such that they are not superposed on each other. A printed board 14 is provided on the rear base 13 on the side of the base body 10.

The traverse base 30 holds a spindle motor 31, a pickup 32 and driving means 33 which moves the pickup 32. The spindle motor 31 is provided on the one end side of the traverse base 30, and the pickup 32 is provided such that the pickup 32 can move from one end to the other end of the traverse base 30. When the pickup 32 is stopped, the pickup 32 is disposed on the other end side of the traverse base 30, i.e., on an outer peripheral side of the base body 10.

In the traverse base 30, the spindle motor 31 is located at a central portion of the base body 10, a reciprocating range of the pickup 32 is located closer to the disk inserting opening 11 than the spindle motor 31, and a reciprocating direction of the pickup 32 is different from an inserting direction of a disk. An angle formed between the reciprocating direction of the pickup 32 and the inserting direction of a disk is 45°.

The traverse base 30 is supported on the base body 10 by a pair of insulators 34A and 34B.

The pair of insulators 34A and 34B are located closer to a stationary position side of the pickup 32 than the spindle motor 31. In this embodiment, the insulator 34A is provided on the side of one end of the disk inserting opening 11 near its inner side, and the insulator 34B is provided at the central portion near the inner side of the disk inserting opening 11. The insulators 34A and 34B include damper mechanisms made of elastic material. The traverse base 30 on the spindle motor 31 side moves closer to and away from the base body 10 around the insulators 34A and 343 as fulcrums.

A sub-slider 50 and a main slider 40 having a traverse cam member 51 which operates the traverse base 30 will be explained.

The main slider 40 and the sub-slider 50 are disposed on the side of the spindle motor 31. The main slider 40 is disposed such that its one end is disposed on the side of a front surface of the chassis body 10 and the other end is on the side of a rear surface of the chassis body 10. The sub-slider 50 is disposed in mutually intersecting direction with the main slider 40 between the traverse base 30 and the rear base 13.

The traverse cam member 51 which displaces the traverse base 30 is provided on a surface of the sub-slider 50 on the side of the spindle motor 31.

A loading motor 60 is disposed on the side of one end of the main slider 40. A drive shaft of the loading motor 60 and the one end of the main slider 40 are connected to each other through a gear mechanism 61.

By driving the loading motor 60, the main slider 40 slides in a longitudinal direction. The main slider 40 is connected to the sub-slider 50 through a cam lever 70.

The cam lever 70 includes a turning fulcrum 71, a pin 72 and a pin 73. The pin 73 is engaged with a cam groove formed in an upper surface of the main slider 40, and is engaged with a cam groove formed in an upper surface of the sub-slider 50 by a pin 74.

The cam lever 70 is operated by moving the main slider 40, and if the sub-slider 50 is moved, the traverse cam member 51 is operated to displace the traverse base 30.

The above explained connector 12, traverse base 30, rear base 13, printed board 14, insulators 34A and 34B, main slider 40, sub-slider 50 and loading motor 60 are provided on the deep bottom 10A of the base body 10. A disk inserting space is formed between these members and a lid 20.

Next, a guide member which supports a disk when the disk is inserted, and a lever member which is operated when a disk is inserted will be explained.

FIG. 2 is a plan view of the apparatus showing a state where a disk is held.

A first disk guide 17 having a predetermined length is provided on one side of the deep bottom 10A near the disk inserting opening 11. The first disk guide 17 has a groove having a U-shaped cross section as viewed from a disk-inserting side. A disk is supported by the groove.

A pull-in lever 80 is provided on the shallow bottom 10B on the side of the disk inserting opening 11. A movable side end of the pull-in lever 80 includes a second disk guide 81. The second disk guide 81 comprises a cylindrical roller, and the second disk guide 81 is turnably provided on a movable-side end of the pull-in lever 80. A groove is formed in a roller outer periphery of the second disk guide 81, and a disk is supported by the groove.

The pull-in lever 80 is disposed such that its movable-side end is operated at a location closer to the disk inserting opening 11 than its stationary-side end, and the pull-in lever 80 is provided at its stationary-side end with a turning fulcrum 82.

The pull-in lever 80 is operated by a sub-lever 90.

The sub-lever 90 is provided at its movable side one end with a projection 91, and at its other end with a turning fulcrum 92. The turning fulcrum 92 of the sub-lever 90 is located on the main slider 40. The turning fulcrum 92 is not operated associatively with the main slider 40, and is fixed to the base body 10. A pin 93 is provided on a lower surface of the sub-lever 90 closer to a projection 91 than the turning fulcrum 92. The pin 93 slides in a cam groove formed in an upper surface of the main slider 40. Therefore, as the main slider 40 moves, the angle of the sub-lever 90 is changed, and if the angle of the sub-lever 90 is changed, the turning angle of the pull-in lever 80 is changed. That is, the second disk guide 81 of the pull-in lever 80 moves closer to and away from the spindle motor 31 by the operation of the sub-lever 90.

An ejection lever 100 is provided on a side of the base body 10 different from the pull-in lever 80. A guide 101 is provided on one end side movable-side end of the ejection lever 100, and a turning fulcrum 102 is provided on the other end of the ejection lever 100. An abutment portion 103 is provided on a movable-side end of the ejection lever 100 closer to the rear surface than the guide 101. The ejection lever 100 is provided with an elastic body 104. One end of the elastic body 104 is fixed to the ejection lever 100, and the other end is fixed to the rear base 13. When the abutment portion 103 is pulled toward the rear surface, the abutment portion 103 abuts against the abutment portion 13A of the rear base 13. The ejection lever 100 is pulled out toward the disk inserting opening 11 by an elastic force of the elastic body 104. The ejection lever 100 is operated in association with the main slider 40 through a link arm 105.

A guide lever 180 is provided on a side of the base body 10 on the same side as the ejection lever 100. A rear surface of the guide lever 180 is a turning fulcrum 181, and the guide lever 180 includes a guide 182 on the movable side. The guide lever 180 is biased such that the guide 182 projects toward a disk by the elastic body. The guide lever 180 is operated in association with the main slider 40 through the link arm 105, and the guide lever 180 on the guide 182 side moves away from a disk in accordance with motion of the main slider 40.

A restriction lever 110 is provided on a rear surface of the base body 10. An end of the restriction lever 110 on the side of the rear surface is a turning fulcrum 111, and is provided at its movable-side end with a guide 112. The restriction lever 110 is biased such that the guide lever 180 on the guide 112 side always projects forward by the elastic body. The restriction lever 110 operates a limit switch at a predetermined position. That is, if a disk is inserted up to the predetermined position, the limit switch is turned OFF to drive the loading motor 60. If the loading motor 60 is driven, the main slider 40 slides.

An arc projection 30D is provided on the traverse base 30 located at an outer periphery of the spindle motor 31, and if the projection abuts against a disk to be attached at a position corresponding to a center non-recording surface, the disk is released.

The base body 10 is provided at its front side with a front guider 21. The front guider 21 is disposed on the side of one end of the disk inserting opening 11 and between the pull-in lever 80 and the disk inserting opening 11. The front guider 21 covers portions of the loading motor 60, the gear mechanism and the main slider 40 and is disposed closer to the lid 20 than these members. The front guider 21 is provided at its periphery with a tapered portion so that the front guider 21 does not come into contact with the entire recording surface of the inserted disk, and a surface of the front guider 21 is coated with urethane fluorine. When the first disk guide 17 and the second disk guide 81 can not sufficiently support a disk, the front guider 21 can prevent a recording surface of the disk from being damaged by inclination in a surface direction of the disk. The front guider 21 may be made of felt material.

FIGS. 3 and 4 are perspective views of essential portions showing the traverse base of the apparatus.

The driving means 33 includes a drive motor 33A and a pair of rails 33B on which the pickup 32 slides. The pair of rails 333 are disposed on both sides such that one end and the other end of the traverse base 30 are connected to each other. The drive motor 33A is disposed outside of one of the rails on the side of the disk inserting opening 11 such that its driving shaft is in parallel to the rails 33B.

FIGS. 5 to 8 are perspective views of essential portions showing constituent parts of the traverse base of the apparatus.

As shown in FIG. 5, a clutch plate 35 includes an opening 35A in which the spindle motor 31 is disposed. Three through holes 353 are formed around the opening 35A, and motor springs 36 are disposed at locations of the through holes 35B, respectively. The clutch plate 35 has a plurality of clutch pins 35C. In this embodiment, one of intersecting side surfaces has one of the clutch pin 35C, and the other side surface has two clutch pins 35C. The clutch plate 35 is formed with an opening 35D into which a stepped screw 18 can be inserted, and a bent portion 35E which is caught on a spindle motor support portion 31A.

Next, the spindle motor 31 is disposed at a location of the opening 35A as shown in FIG. 6. A spindle motor support portion 31A is formed around the spindle motor 31. The spindle motor 31 is held by the spindle motor support portion 31A.

The spindle motor support portion 31A includes three through holes 31B at locations corresponding to the through holes 35B. The motor springs 36 are disposed between the spindle motor support portion 31A and the clutch plate 35. The spindle motor support portion 31A is formed with an opening 31C into which the stepped screw 18 can be inserted, and with a notch 31D which is engaged with the bent portion 35E.

Next, the spindle motor 31 is disposed on the traverse base 30 as shown in FIG. 7. The traverse base 30 includes a plurality of traverse cam pins 30A. In this embodiment, Two traverse cam pins 30A is provided on one of mutually intersecting two side surfaces of the traverse base 30. The traverse base 30 forms an opening 30B for releasing the stepped screw 18. The traverse base 30 also includes three motor pins at locations corresponding to the through holes 35B of the clutch plate 35.

Next, as shown in FIG. 8, a first spindle cam member 52 is disposed on one of mutually intersecting two side surfaces of the traverse base 30, and a second spindle cam member 41 is disposed on the other side surface of the traverse base 30. Therefore, the first spindle cam member 52 is disposed in parallel to the traverse cam member 51, and the second spindle cam member 41 is disposed in parallel to the main slider 40.

The vertical movement of the spindle motor of the apparatus will be explained.

FIG. 9 is a perspective view of an essential portion showing a state where the spindle motor of the disk apparatus is moved downward. FIG. 10 is a side sectional view of the state. FIG. 11 is a perspective view of an essential portion showing a state where the spindle motor of the disk apparatus is moved upward. FIG. 12 is a side sectional view of the state.

A spindle lever 42 shown in FIGS. 9 and 11 has a groove in which the pin 72 of the cam lever 70 slides. The second spindle cam member 41 is moved in the same direction as that of the main slider 40 by the movement of the cam lever 70. As shown in FIGS. 10 and 12, the lid 20 is formed at its central portion with an opening 21. The opening 21 is a circular opening having a radius greater than that of a center hold of a disk X, and is an opening greater than a hub of the spindle motor 31 which is fitted into the center hole of the disk X. The opening 21 is formed at its outer periphery with a throttle 22 projecting toward the base body 10.

As shown in FIGS. 9 and 10, since the clutch pins 350 are disposed on the side of the base body 10 by the first spindle cam member 52 and the second spindle cam member 41, the clutch plate 35 is restricted at a position closest to the base body 10.

Each motor spring 36 biases the spindle motor support portion 31A and the clutch plate 35 in a direction separating them from each other, but they are fixed by the stepped screw 18 or the like so that they are not separated from each other more than a predetermined distance.

If the main slider 40 moves from this state, the cam lever 70 is turned around the turning fulcrum 71 by a predetermined angle. By this turning motion of the cam lever 70, the first spindle cam member 52 and the second spindle cam member 41 are moved by a predetermined distance.

FIGS. 11 and 12 show this state.

By the movements of the first spindle cam member 52 and the second spindle cam member 41, each the clutch pin 35C moves toward the lid 20. By the movement of the clutch pin 35C, the clutch plate 35 moves toward the lid 20 and the spindle motor 31 also moves toward the lid 20 through the motor spring 36.

Here, a stroke B of the clutch plate 35 is set greater than a stroke A of the spindle motor 31. For example, the stroke B of the clutch plate 35 is 2.4 mm, and the stroke A of the spindle motor 31 is 2.0 mm. If the stroke B of the clutch plate 35 is set greater than the stroke A of the spindle motor 31, a biasing force of the motor spring 36 is applied only to an over stroke portion (0.4 mm) of the clutch plate 35 after the spindle motor 31 moves upward by the stroke. When the spindle motor 31 is moved downward, the biasing force of the motor spring 36 is not applied. Further, since a load of the motor spring 36 can be set to high value, the biasing force of the spindle motor 31 acting on the traverse base 30 can be made strong, and the stability against the self vibration and disturbance vibration can be enhanced. Further, since it is possible to bias the spindle motor 31 against the traverse base 30 with a high load, it is possible to enhance the stability of the repeat accuracy.

At the time of chucking operation, the traverse cam pins 30A move toward the lid 20 by the traverse cam member 51 from the state shown in FIGS. 11 and 12, thereby further moving the traverse base 30 toward the lid 20.

[INDUSTRIAL APPLICABILITY]

The present invention can be utilized for a disk apparatus for recording or replaying into or from a disk-like recording medium such as a CD and a DVD, which is used as a domestic video apparatus or a peripheral device for a computer, which is required to be thin, in which even if the movement of a traverse base for reliably loading a disk on a spindle motor is minimized, it is possible to secure a space in which the disk is reliably automatically attached.

The invention claimed is

1. A slot-in type disk apparatus in which a base body and a lid constitute a chassis outer sheath, a front surface of said chassis outer sheath is formed with a disk inserting opening from which a disk is directly inserted, said base body is provided with a traverse base, said traverse base is provided with a spindle motor, a pickup and driving means for moving said pickup, said slot-in type disk apparatus is provided with a traverse moving means which displaces said traverse base between said base body and said lid, and said traverse base moving means comprises a loading motor provided on said chassis outer sheath, a slider which slides by driving of said loading motor, and a traverse cam member which is operated by movement of said slider, wherein said disk apparatus comprises a spindle motor support portion which holds said spindle motor, a spindle cam member which is operated by movement of said slider, a clutch plate configured to move toward and away from said traverse base by said spindle cam member, and a motor spring having a biasing force and disposed between said spindle motor support portion and said clutch plate, wherein said clutch plate has a set stroke B and is positioned to move toward said traverse base, and said spindle motor has a set stroke A and is positioned to move toward said disk, to compress said motor spring, with the stroke B of the clutch plate being greater than the stroke A of the spindle motor such that the biasing force of the motor spring is applied only to an over stroke portion of the clutch plate after the spindle motor is moved upward.

2. The slot-in type disk apparatus according to claim , wherein said motor spring is disposed on the side of an outer periphery of said spindle motor.

3. The slot-in type disk apparatus according to claim 1, wherein said spindle cam member comprise two members disposed in mutually intersecting directions, said traverse cam member and said slider are disposed in mutually intersecting directions, one of said two members of said spindle cam member is disposed in parallel to said traverse cam member, and the other of said two members of said spindle cam member is disposed in parallel to said slider.

4. The slot-in type disk apparatus according to claim 1, wherein said clutch plate is disposed on the side of an outer periphery of said spindle motor.

5. The slot-in type disk apparatus according to claim 1, wherein said traverse base has a projection for releasing an attached disk, and said projection is disposed on an outer periphery of said spindle motor.

* * * * *